(12) United States Patent
Chou et al.

(10) Patent No.: US 8,360,086 B2
(45) Date of Patent: Jan. 29, 2013

(54) OMNIBUS QUASI-HYDROSYSTEM

(75) Inventors: Ying-Chyi Chou, Taichung (TW); Wei-Che Chiu, Hsinchu (TW)

(73) Assignee: Innotech Corporation, Taipei (TW)

( * ) Notice: Subject to any disclaimer, the term of this patent is extended or adjusted under 35 U.S.C. 154(b) by 832 days.

(21) Appl. No.: 12/234,660

(22) Filed: Sep. 21, 2008

(65) Prior Publication Data

US 2009/0293972 A1   Dec. 3, 2009

(30) Foreign Application Priority Data

May 27, 2008   (TW) ................................ 97119569 A

(51) Int. Cl.
*G05D 11/00* (2006.01)
*F15B 13/00* (2006.01)
*F16K 1/00* (2006.01)

(52) U.S. Cl. ........................ 137/111; 137/884

(58) Field of Classification Search .................. 137/111, 137/597, 468, 884; 236/101 R, 103, 101 E
See application file for complete search history.

(56) References Cited

U.S. PATENT DOCUMENTS

| | | | | |
|---|---|---|---|---|
| 1,797,591 A | * | 3/1931 | Sartakoff | 137/557 |
| 4,355,659 A | * | 10/1982 | Kelchner | 137/625.19 |
| 4,602,657 A | * | 7/1986 | Anderson et al. | 137/595 |
| 5,209,258 A | * | 5/1993 | Sharp et al. | 137/343 |
| 5,417,243 A | * | 5/1995 | Ragona | 137/625.19 |
| 5,709,247 A | * | 1/1998 | Hutton | 137/884 |
| 6,345,770 B1 | | 2/2002 | Simensen | |
| 7,089,960 B2 | * | 8/2006 | Maruta | 137/625.22 |
| 2001/0029983 A1 | * | 10/2001 | Unger et al. | 137/597 |
| 2005/0236049 A1 | | 10/2005 | Manson et al. | |

FOREIGN PATENT DOCUMENTS

| | | |
|---|---|---|
| CN | 2893347 Y | 4/2007 |
| CN | 101070926 A | 11/2007 |
| TW | M283334 A1 | 12/2005 |

* cited by examiner

*Primary Examiner* — Dinh Q Nguyen
*Assistant Examiner* — Chee-Chong Lee
(74) *Attorney, Agent, or Firm* — Pai Patent & Trademark Law Firm; Chao-Chang David Pai

(57) ABSTRACT

An omnibus quasi-hydrosystem is disclosed. The omnibus quasi-hydrosystem includes a module base, at least two channel switching members mounted in the module base, at least two inlets formed in the module base and at least two outlets formed in the module base. The inlets allow fluid entering into the omnibus quasi-hydrosystem, the channel switching members alter the fluid path in the omnibus quasi-hydro system to a desired outlet to output the fluid. In addition, a modular omnibus quasi-hydrosystem is also disclosed herein.

4 Claims, 5 Drawing Sheets

OMNIBUS QUASI-HYDROSYSTEM

RELATED APPLICATIONS

The present application is based on, and claims priority from, Taiwan Application Serial Number 97119569, filed May 27, 2008, which is herein incorporated by reference.

FIELD OF THE INVENTION

The present invention generally relates to an omnibus quasi-hydrosystem. More particularly, this invention relates to an omnibus quasi-hydrosystem of a fluid supplying apparatus.

BACKGROUND OF THE INVENTION

With the fast development of the semiconductor manufacturing process, the performance and layers of semiconductor devices have increased. Therefore, the uniformity of the thickness of each layer is very important. During the chemical mechanic polishing (CMP), the etching process or the photolithography process, air and fluid are used. Hence, in a semiconductor factory, the supply pipes to deliver the air or the liquids are frequently used.

In the semiconductor equipment and factory, control valves are the major devices for the fluid supplying equipment. The control valve can control the liquid flow rate and flow direction in the process pipes. Therefore, the control valves occupy quite a large volume in the fluid supplying equipment. Especially, when a plurality of control valves are connected together through the pipes, the occupied volume thereof is significantly increased so that the construction and operation of the fluid supplying equipment are difficult and inconvenient. In addition, numerous pipes and control valves perplex the users and the operators to repair these pipes and control valves.

Hence, there is a need to reduce the occupied volume and the quantities of the control valves and the pipes therebetween and still maintain the same or better function for the fluid supplying equipment.

SUMMARY OF THE INVENTION

One objective of the present invention is to provide an omnibus quasi-hydrosystem integrating a plurality of channel switching members to control the flowing direction of the fluid.

Another objective of the present invention is to provide an omnibus quasi-hydrosystem integrating a plurality of channel switching members to reduce the quantities of the control valves and the pipes so as to improve the delivery quality and efficiency of the fluid supplying equipment and reduce the construction cost for the fluid supplying equipment and the factory with the same.

To achieve these and other advantages and in accordance with the objective of the present invention, as the embodiment broadly describes herein, the present invention provides an omnibus quasi-hydrosystem that includes a module base, at least two channel switching members configured in the module base, at least two inlets formed in the module base allowing at least two fluids to enter into the channel switching members and at least two outlets. Each of the fluids is exhausted from one of the outlets according to the operation angles of the channel switching members.

The channel switching members and the module base can form at least one four way fluid control valve and at least one T-shaped three way fluid control valve beside the four way fluid control valve. Preferably, four T-shaped three way fluid control valves encircle the four way fluid control valve.

In another preferred embodiment, the channel switching members and the module base can form at least one four way fluid control valve and at least one L-shaped three way fluid control valve beside the four way fluid control valve. Preferably, four L-shaped three way fluid control valves encircle the four way fluid control valve. In addition, the module base can further include a sensing device thereon, for example, a pressure meter or a flow meter. The module base can also further include a fluid control device, for example, a needle valve, a flow control valve, a damper or a pressure regulator.

The omnibus quasi-hydrosystem according to the present invention can further include a plurality of fluid channels formed in the module base to connect the inlet or the outlet to the channel switching members and to change the fluid flowing direction. The module base can be made of a metal material, for example, stainless, copper or aluminum. Alternatively, the module base can be made of a nonmetal material, for example, Polypropylene (PP), Polyvinyl chloride (PVC), Chlorinated polyvinyl chloride (CPVC), Polytetrafluoroethylene (PTFE) and Perfluoroalkoxy alkane (PFA).

Another aspect of the present invention is to provide a modular omnibus quasi-hydrosystem that includes a plurality of modular fluid control valves, sensing devices and/or fluid control devices coupled together. The fluid control valves include a plurality of channel switching members and a plurality of module bases. The module bases are coupled together and the channel switching members are configured in the module bases. The modular omnibus quasi-hydrosystem includes at least two inlets and at least two outlets to control at least two fluids entering into the fluid control valves and exhausting there from. In addition, the modular fluid control valves can further include a sensing device thereon, for example, a pressure meter or a flow meter. The modular fluid control valves can be a needle valve, a flow control valve, a damper or a pressure regulator.

Hence, the omnibus quasi-hydrosystem according to the present invention can effectively reduce the occupied space for the fluid supplying equipment in a factory, and especially for a semiconductor factory or a liquid crystal display factory. The omnibus quasi-hydrosystem according to the present invention can expedite the assembly speed to install the fluid supplying equipment. Furthermore, the omnibus quasi-hydrosystem according to the present invention can effectively improve the stability for the fluid supplying equipment and reduce the manufacturing cost and the cost to build the factory.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
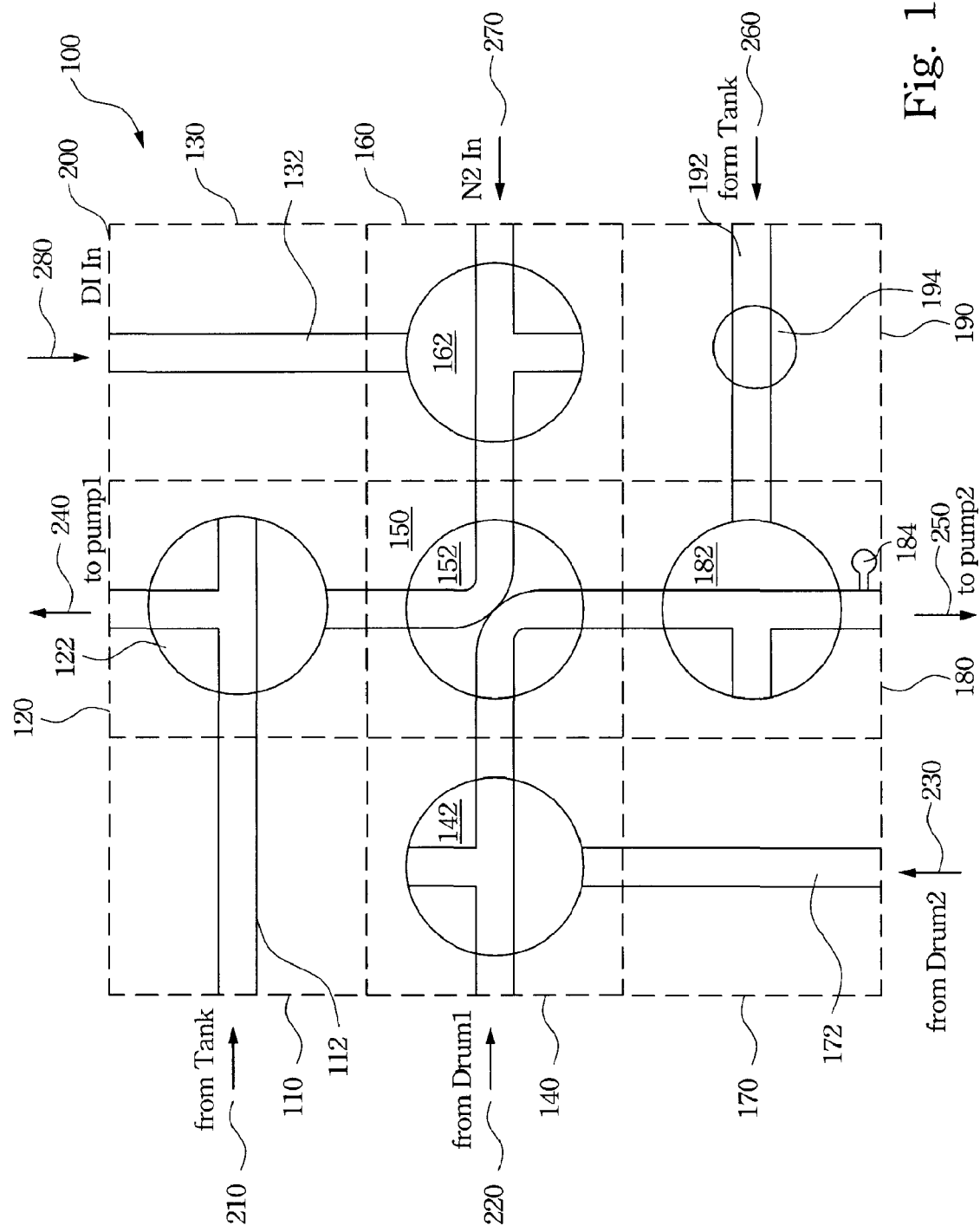
FIG. 1 illustrates a preferred embodiment of an omnibus quasi-hydrosystem according to the present invention.

Refer to FIG. 1. FIG. 1 illustrates a preferred embodiment of an omnibus quasi-hydrosystem according to the present invention. Preferably, the omnibus quasi-hydrosystem has at least has two fluid inlets, two fluid outlets and two fluid control valves. The omnibus quasi-hydrosystem 100 includes a module base 200 with internal pipes and multiple openings formed in the module base 200 to respectively install channel switching members 122/142/152/162/182 therein so as to form fluid control valves 120/140/150/160/180. In addition, the fluid channel members 110/130/170/190 can guide the fluid by the respective fluid channels 112/132/172/192.

In this preferred embodiment, the fluid control valve 150 is preferably a four way fluid control valve with two L-shaped channels to respectively control the fluid to the desired pipe. The fluid control valves 120/140/160/180 are composed of T-shaped fluid control valves. Therefore, when the fluid enters the omnibus quasi-hydrosystem according to the present invention through the inlet 210, the fluid first enters into the fluid channel member 110 through the fluid channel 112, then enters into the fluid control valve 120. When the channel switching member 122 is turned to a desired position, for example, the fluid can go out through the outlet 240 to an external device. In addition, when the channel switching member 122 is turned about 90 degrees, the channel switching member 122 is closed so that the fluid cannot further be guided to the outlet 240.

In addition, when the fluid enters into the fluid control valve 140 through the inlet 220, the channel switching member 142 can guide the fluid to the fluid control valve 150, and then the channel switching member 142 can further guide the fluid to the fluid control valve 180. The channel switching member 182 can further guide the fluid to a desired outlet according to the angle selection of the channel switching member 182, for example, the channel switching member 182 can guide the fluid to the outlet 250 and further to an external device. Alternatively, the fluid control valve 140 or the fluid control valve 180 can also be closed to stop transporting the fluid to the external device.

In addition, the omnibus quasi-hydrosystem according to the present invention can further install sensing devices 184/194 on the module base, for example, a pressure meter on the fluid control valve 180 or a flow meter on the fluid channel member 190. The channel switching member and the module base can also be formed to any other fluid control device, for example, a needle valve, a flow control valve, a damper or a pressure regulator.

Furthermore, the outlet and the inlet are the relative terms. When the fluid enters into the omnibus quasi-hydrosystem according to the present invention, the opening is defined as the inlet. Contrarily, when the fluid is pushed out from the omnibus quasi-hydrosystem according to the present invention through the opening, the opening is defined as an outlet. Hence, the inlet and the outlet are changeable and can be also referred to as a fluid gate to enter or exhaust the fluid.

Accordingly, the omnibus quasi-hydrosystem according to the present invention can guide the fluid to a desired device by way of the angle selection of the channel switching member. In addition, the omnibus quasi-hydrosystem according to the present invention can adopt an integrated module base to save the pipe required therein and reduce the occupied volume of the omnibus quasi-hydrosystem so as to further reduce the occupied space in the factory.

The module base 200 can be formed by a single bulk material and the channel switching members are subsequently disposed therein. Alternatively, the module base 200 can also be combined with a plurality of bulk materials. The bulk materials are respectively machined and the channel switching members are disposed therein to form respective fluid devices. Therefore, the fluid devices are subsequently combined together to form the omnibus quasi-hydrosystem.

Figure 2:
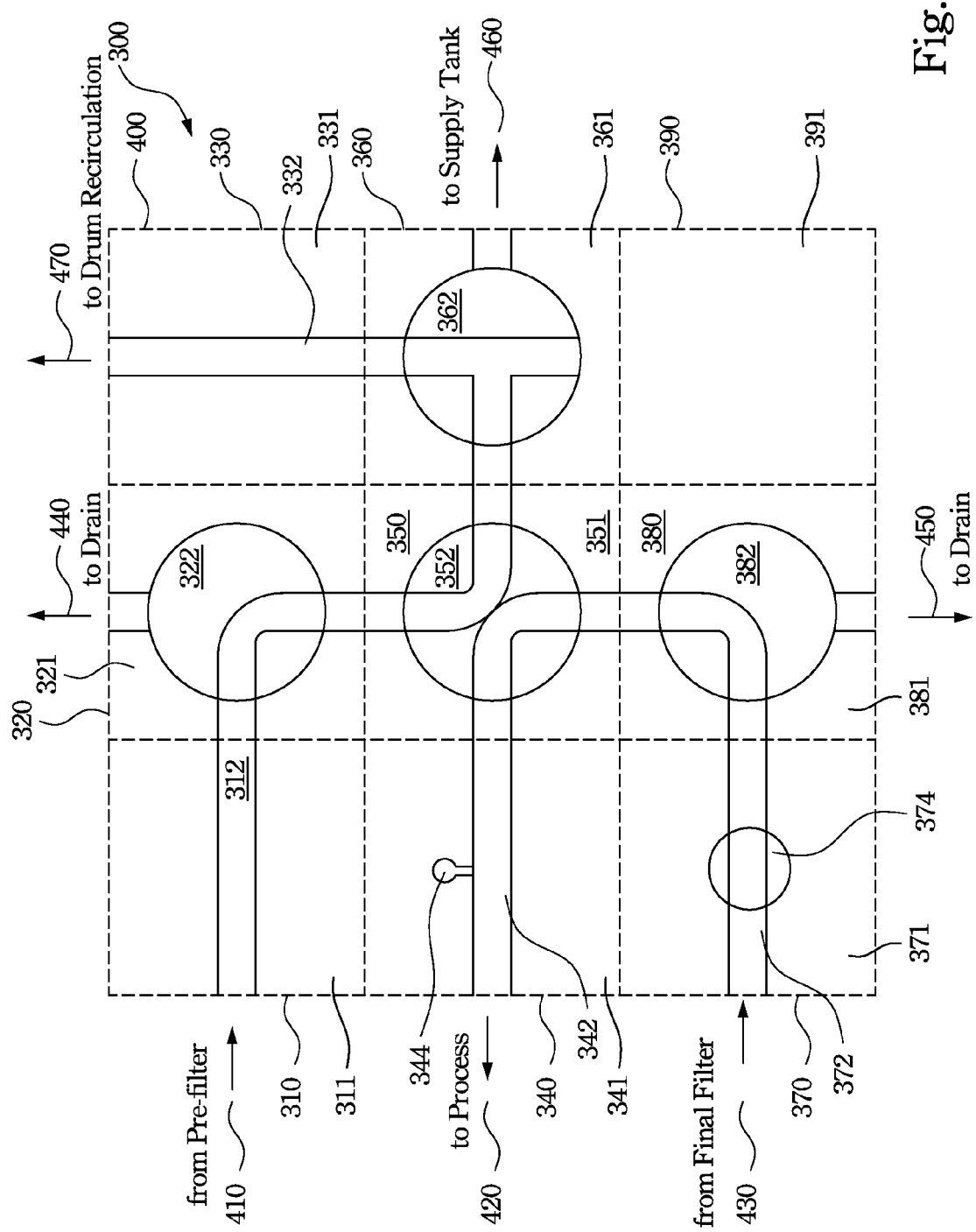
FIG. 2 illustrates another preferred embodiment of an omnibus quasi-hydrosystem according to the present invention.

Refer to FIG. 2. Another preferred embodiment of an omnibus quasi-hydrosystem according to the present invention is illustrated. The omnibus quasi-hydrosystem 300 includes fluid channel members 310/330/340/370, fluid control valves 320/350/360/380 and an unfluid channel member 390. The fluid channel members 310/340/370 are assembled or formed to construct the exterior shape of the omnibus quasi-hydrosystem according to the present invention to a regular shape so as to be easily installed or replaced. However, if the omnibus quasi-hydrosystem has no fluid channel member 310/340/370, the pipes originally connected to the fluid channel member 310/340/370 can also be directly connected to the corresponding openings on the fluid control valve 320/350/380 to further reduce the volume of the omnibus quasi-hydrosystem.

Similarly, the unfluid channel member 390 can help to form the exterior shape of the omnibus quasi-hydrosystem to easily install and replace the omnibus quasi-hydrosystem. The unfluid channel member can be also removed from the omnibus quasi-hydrosystem to reduce the occupied volume of the omnibus quasi-hydrosystem.

In this preferred embodiment, the fluid control valve 350 is a four way fluid control valve and the channel switching member 352 thereof has two L-shaped channels to control the fluid to desired pipes. The fluid control valves 320/360/380 are the T-shaped fluid control valves. Therefore, the fluid entering into the omnibus quasi-hydrosystem from the inlet 410 can be guided to the fluid control valve 320 through the fluid channel 312, and the fluid can be further guided to the fluid control valve 350 or the outlet 440 according to the selection of the channel switching member 322. If the fluid is guided to the fluid control valve 350, the fluid control valve 350 can further guide the fluid to the fluid control valve 360, the fluid channel member 330 and the outlet 470. At this moment, the fluid entering the omnibus quasi-hydrosystem from the inlet 430 can be guided to the fluid control valve 380, to the fluid control valve 350 according to the selection of the channel switching member 382, and further to the process through the outlet 420. Alternatively, the channel switching member 382 of the fluid control valve 380 can be turned 90 degrees counterclockwise to allow the fluid to be pushed out through the outlet 450.

If the channel switching member 352 of the fluid control valve 350 is turned about 90 degrees, the fluid entering from the inlet 410 can be guided to the process pipe through the outlet 420. At this moment, the fluid entering from the inlet 430 can be guided to the fluid storing drum through the outlet 470. Therefore, users can select the angle of the channel switching member 362 of the fluid control valve 360 to determine the destination of the fluid in the pipe, for example, to the supply tank through the outlet 460 or to the pressure storing drum through the outlet 470. The omnibus quasi-hydrosystem can also include fluid sensing devices 344/374 in the module base, for example, a pressure meter on the fluid channel member 340 or a flow meter on the fluid channel member 370. In addition, the channel switching member and the module base can also be formed to any other fluid control device, for example, a needle valve, a flow control valve, a damper or a pressure regulator.

The module base 400 can be formed by a single bulk material and the channel switching members are subsequently disposed therein. Alternatively, the module base 400 can also be combined with a plurality of bulk materials, i.e. a plurality of rectangular shaped module base components 311/321/331/341/351/361/371/381/391. The bulk materials are respectively machined and the channel switching members are disposed therein to form respective fluid devices, i.e. the fluid channel members 310/330/340/370 and the fluid control valves 320/350/360/380. Therefore, the fluid devices are subsequently combined together to form the rectangular shaped omnibus quasi-hydrosystem 300.

Figure 3:
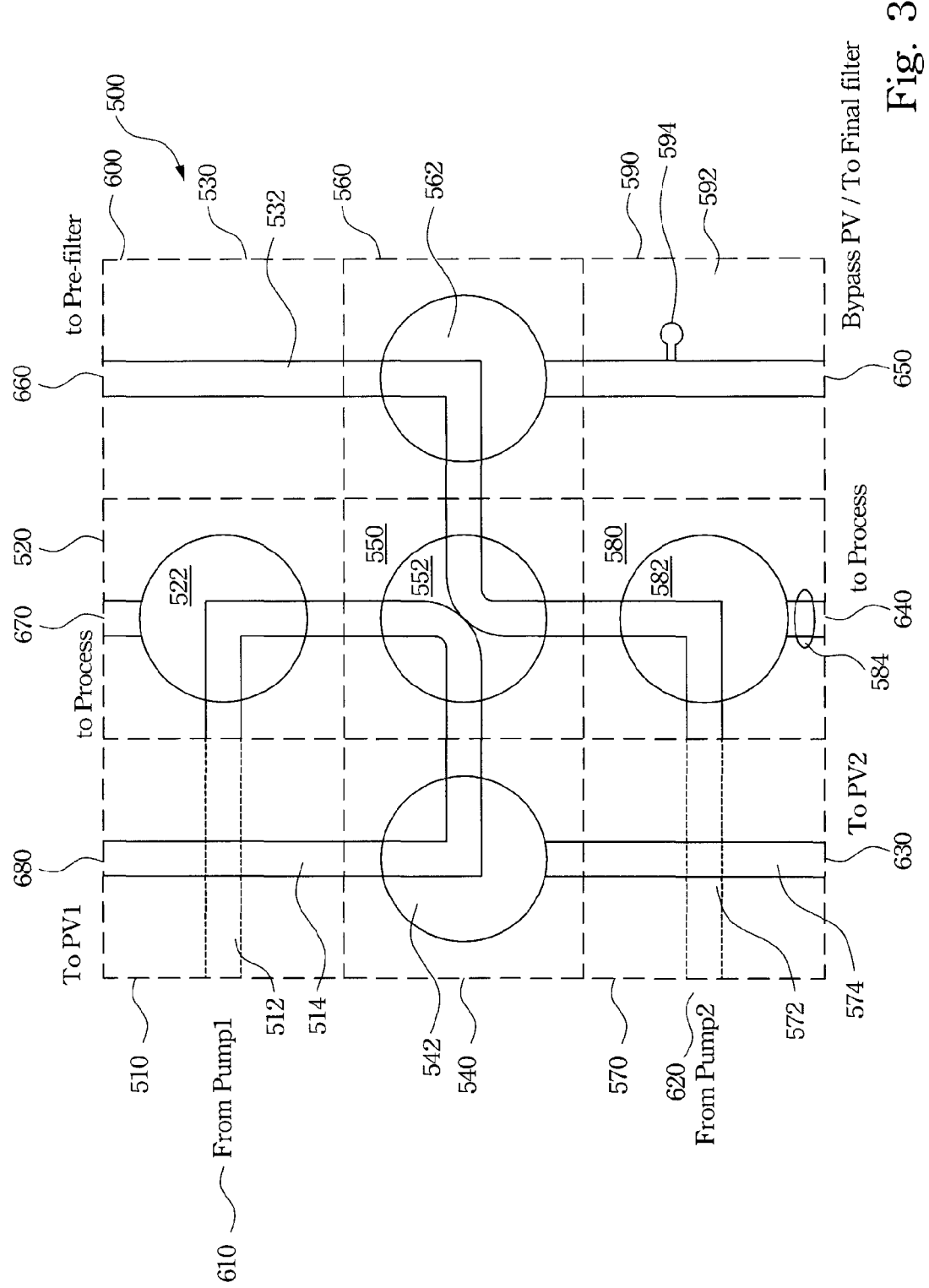
FIG. 3 illustrates further another preferred embodiment of an omnibus quasi-hydrosystem according to the present invention.

Refer to FIG. 3. Another preferred embodiment of the omnibus quasi-hydrosystem according to the present invention is illustrated. The omnibus quasi-hydrosystem 500 according to the present invention includes fluid channel members 510/530/570/590, and fluid control valves 520/540/550/560/580. The fluid control valve 550 is preferably a four way fluid control valve with a channel switching member 552 having two L-shaped channels to control the fluid to desired pipes. In this preferred embodiment, the fluid control valves 520/540/560/580 are L-shaped three way fluid control valves. Similarly, to change the angle of the channel switching members 522/542/552/562/582 can further change the inlet and the outlet for the fluid so as to change the direction and destination of the fluid.

The omnibus quasi-hydrosystem can further adopt sensing devices 594/584 installed on the module base, for example, a pressure meter installed on the fluid channel member 590 or a flow meter installed on the fluid control valve 580. The channel switching member and the module base can also be formed to any other fluid control device, for example, a needle valve, a flow control valve, a damper or a pressure regulator.

Furthermore, the fluid channel member 510 can include a first fluid channel 512 and a second fluid channel 514 independent to the first fluid channel 512. The first fluid channel 512 and the second fluid channel 514 forms a predetermined angle therebetween, and preferably the first fluid channel 512 and the second fluid channel 514 are perpendicular to each other. The fluid channel member 510 can be configured at a corner of the omnibus quasi-hydrosystem to provide more inlets and outlets to enhance the function and capacity for the omnibus quasi-hydrosystem.

Figure 4:
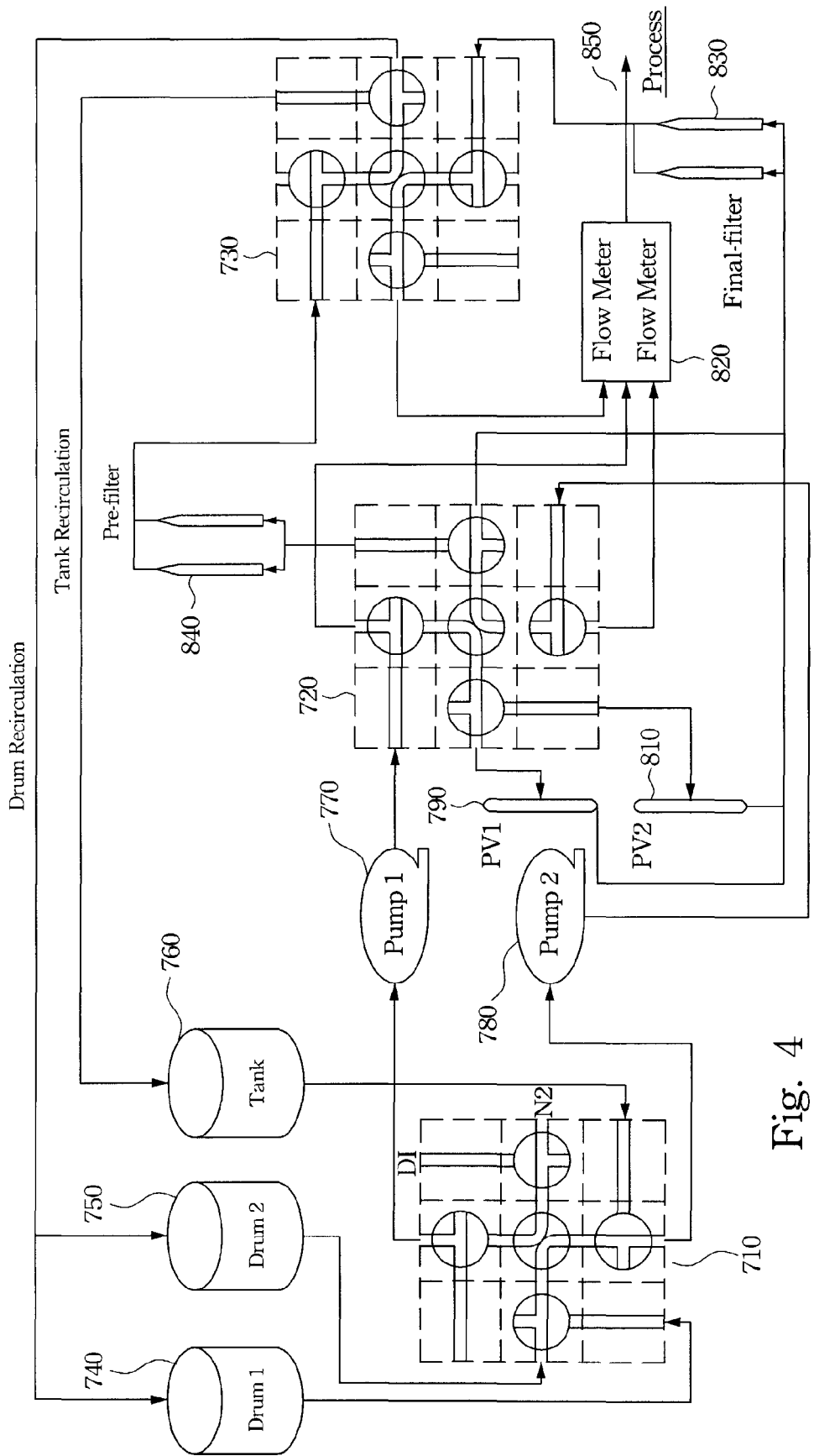
FIG. 4 illustrates a fluid supplying equipment with an omnibus quasi-hydrosystem according to the present invention.

Refer to FIG. 4. A fluid supplying equipment with the omnibus quasi-hydrosystem according to the present invention is illustrated. Generally, the fluid supplying equipment can be air or liquid supplying equipment in a semiconductor factory, a display panel factory or any other factory. Conventional fluid supply equipment normally needs about 60 control valves to control the direction of the fluid flow in the pipes. In addition, each control valve requires at least two couplings. Therefore, the conventional fluid supplying equipment needs more than 120 couplings and each coupling may influence the total stability and safety of the fluid supplying equipment. Since each coupling may influence the total stability and safety of the fluid supplying equipment, each coupling has to be checked again and again to ensure the safety of the fluid supplying equipment. In addition, too many couplings installed in the conventional fluid supplying equipment takes a longer delivery time and reduces the reliability of the fluid supplying equipment.

In FIG. 4, only three omnibus quasi-hydrosystems are adopted in a fluid supplying equipment. The three omnibus quasi-hydrosystems can control most of the fluid flowing directions and destinations in the fluid supplying equipment. As shown in FIG. 4, the first omnibus quasi-hydrosystem 710, the second omnibus quasi-hydrosystem 720 and the third omnibus quasi-hydrosystem 730 are respectively connected to a first storing drum 740, a second storing drum 750, a pressure tank 760, a first pump 770, a second pump 780, a first pressure vessel 790 and a second pressure vessel 810 to control most fluid flowing directions in the fluid supplying equipment. Hence, the couplings and pipes between the control valves are effectively decreased. Accordingly, the delivery time of the fluid supplying equipment with the omnibus quasi-hydrosystem according to the present invention can effectively reduced. The quality and stability of the fluid supplying equipment is enhanced. Although the cost of one omnibus quasi-hydrosystem is higher than one control valve, the total cost of the fluid supplying equipment may reduced. It is worth noting that the quantities of the control valves and the couplings and pipes between the control valves are obviously reduced so that the costs of manufacture and installation are reduced.

In addition, a flow meter 820, a final filter 830 and a pre-filter 840 can be installed in the pipes of the fluid supplying equipment to supply a required fluid to the manufacturing process through the process pipe 850. The flow meter 820, the final filter 830 and the pre-filter 840 can also be formed in the omnibus quasi-hydrosystem to further reduce the occupied volume and required couplings in the fluid supplying equipment.

The fluid control valve, the fluid channel, the channel switching member and the module base can be made of metal material, for example stainless, copper or aluminum, or non-metal material, for example Polypropylene (PP), Polyvinyl chloride (PVC), Chlorinated polyvinyl chloride (CPVC), Polytetrafluoroethylene (PTFE) or Perfluoroalkoxy alkane (PFA).

Figure 5:
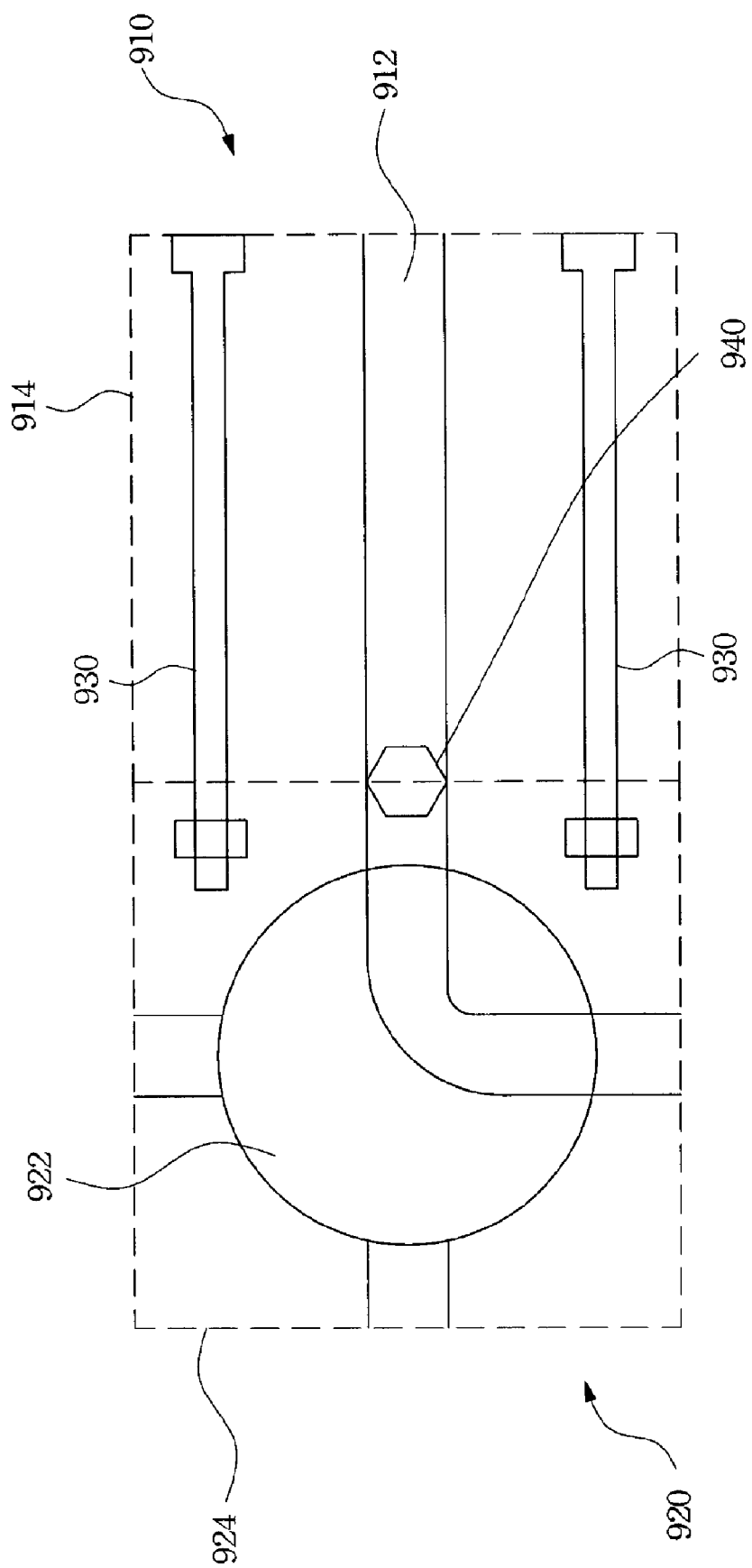
FIG. 5 illustrates still another preferred embodiment of an omnibus quasi-hydrosystem according to the present invention.

Refer to FIG. 5. Still another preferred embodiment of the omnibus quasi-hydrosystem according to the present invention is illustrated. FIG. 5 illustrates a partial portion of a modular omnibus quasi-hydrosystem according to the present invention. The module base of the omnibus quasi-hydrosystem can be respectively formed according to the function and shape of each fluid control valve and fluid channel member. The modular fluid control valves are preferably formed to the rectangular shape and connected together with channel connecting members. The fluid channel member 910 includes a module base 914 and a fluid channel 912 formed therein, and the fluid control valve 920 is constructed with the module base 924 and the channel switching member 922. Therefore, the fluid channel member 910 and the fluid control valve 920 can be respectively formed on the module base 914 and the module base 924. Then, the fluid channel member 910 and the fluid control valve 920 are connected and fixed together with the channel connecting member 940 and the module base connecting member 930 to form the modular omnibus quasi-hydrosystem according to the present invention. The channel connecting member 940 is preferably a hollow guiding connector with two tapered end portions to close connect the fluid channels in the module base 914 and the module base 924. The module base connecting member 930, for example, a bolt and a nut, can effectively fix the module base 914 and the module base 924. Two module base connecting members 930 can parallelly or perpendicularly configured in the module base, and preferably, the module base connecting members 930 are disposed at different altitudes to prevent interference.

Hence, the modular omnibus quasi-hydrosystem can flexibly configure desired fluid channel members and desired fluid control valves together to further improve the application scope of the omnibus quasi-hydrosystem according to the present invention. The omnibus quasi-hydrosystem according to the present invention can integrate a plurality of channel switching members to control the fluid flowing direction and reduce the quantities of connecting pipes and control valves. Therefore, the couplings in the fluid supplying equipment are reduced and the fluid supplying quality and efficiency are improved. The occupied space of the fluid supplying equipment in the factory is effectively reduced so as to reduce the construction cost for the fluid supplying equipment and the factory.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. An assembly of three module by three module omnibus quasi hydrosystem, comprising:
a plurality of fluid control valves, wherein the fluid control valves further comprise a plurality of channel switching members and a plurality of rectangular shaped module base components, wherein the rectangular shaped module base components are coupled together to form a module base and the channel switching members are configured in the rectangular shaped module base components;
at least two inlets formed in the rectangular shaped module base components to allow at least two fluids to enter into the fluid control valves; and
at least two outlets formed in the rectangular shaped module base components, wherein each of the fluids is exhausted from one of the outlets according to operation angles of the channel switching members, wherein the fluid control valves comprise a four wag fluid control valve disposed in a central position, and four T-shaped fluid control valves or four L-shaped fluid control valves are connected to four sides of the four wag fluid control valve.

2. The assembly of three module by three module omnibus quasi hydrosystem of claim 1, further comprising a plurality of fluid channel members to connect to the rectangular shaped module base components.

3. The assembly of three module by three module omnibus quasi hydrosystem of claim 1, further comprising an unfluid channel member to couple to the rectangular shaped module base components.

4. The assembly of three module by three module omnibus quasi hydrosystem of claim 1, wherein the module base further comprises a sensing device or a fluid control device.

* * * * *